(12) United States Patent
Bilcik

(10) Patent No.: US 6,969,049 B2
(45) Date of Patent: Nov. 29, 2005

(54) DEVICE FOR MOUNTING ON A VEHICLE FOR HOISTING AND TRANSPORTING A BIG-GAME CARCASS

(76) Inventor: Lawrence Stephen Bilcik, 2830 Beam Road, Creston BC (CA) V0B 1G1

( * ) Notice: Subject to any disclaimer, the term of this patent is extended or adjusted under 35 U.S.C. 154(b) by 42 days.

(21) Appl. No.: 10/712,994

(22) Filed: Nov. 17, 2003

(65) Prior Publication Data

US 2005/0104052 A1    May 19, 2005

(51) Int. Cl.[7] ............................................. B66D 1/26
(52) U.S. Cl. .................... 254/278; 255/283; 452/185
(58) Field of Search ........................... 254/278–280, 254/283, 294; 452/187, 125, 128, 185, 189

(56) References Cited

U.S. PATENT DOCUMENTS

| | | | |
|---|---|---|---|
| 410,507 A | * | 9/1889 | Fain ......................... 254/278 |
| 702,250 A | * | 6/1902 | Sharp ........................ 37/316 |
| 1,118,241 A | * | 11/1914 | Sigafoos ..................... 187/259 |
| 2,019,511 A | * | 11/1935 | Stahl ......................... 254/278 |
| 2,213,766 A | * | 9/1940 | Johnson ...................... 254/279 |
| 2,301,994 A | * | 11/1942 | Atkinson ..................... 254/280 |
| 4,806,063 A | | 2/1989 | York |
| 5,219,106 A | | 6/1993 | Glunt |
| 5,224,636 A | | 7/1993 | Bounds |
| 5,417,609 A | | 5/1995 | Oldham |
| 5,562,534 A | | 10/1996 | McGough |
| 5,591,077 A | | 1/1997 | Rowe |
| 5,660,143 A | | 8/1997 | Waring-Brown |
| 5,820,455 A | | 10/1998 | Breedlove |
| 5,890,453 A | | 4/1999 | Waring-Brown |
| 5,911,556 A | | 6/1999 | Caldwell |
| 6,089,431 A | | 7/2000 | Heyworth |
| 6,250,483 B1 | | 6/2001 | Frommer |
| 6,463,886 B1 | | 10/2002 | Rodden et al. |

* cited by examiner

*Primary Examiner*—Emmanuel Marcelo
(74) *Attorney, Agent, or Firm*—Robert H. Barrigar

(57) ABSTRACT

A vehicle-mounted device for hoisting and transporting big game such as deer, and more particularly a device for mounting on an all-terrain vehicle such as a quad, is disclosed. The device includes two or more spaced-apart lift lines for encircling the trunk of a big-game carcass so as to hoist and transport the carcass with the trunk extending substantially horizontally. The lift lines are attached to a common reel rotatably mounted to the vehicle. The device includes a hand crank for rotating the reel so as to spool in the lift lines and a hand-manipulable set screw for locking the reel and lift lines during transportation of the carcass.

17 Claims, 7 Drawing Sheets

FIG. 2
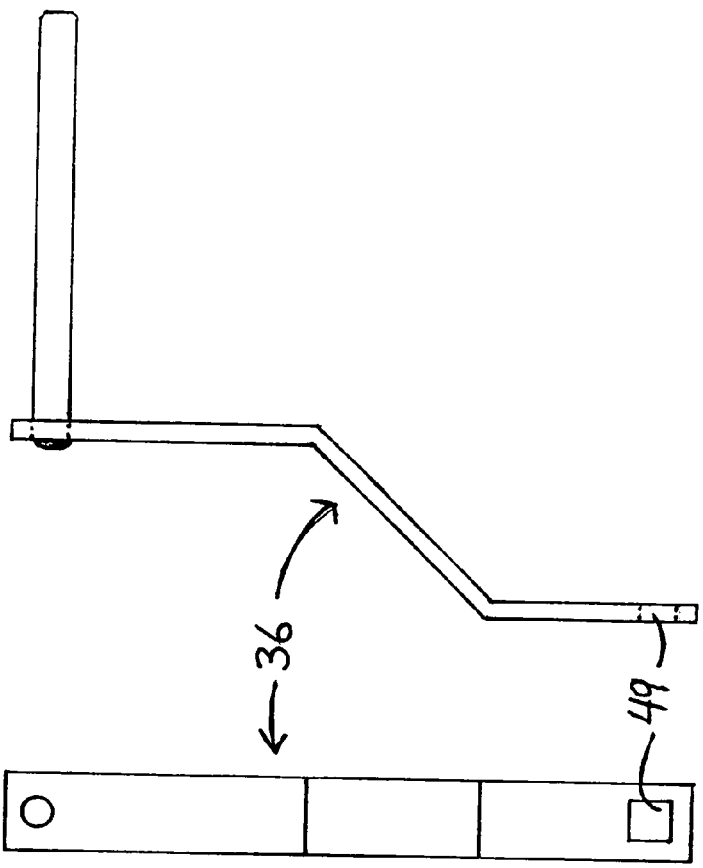
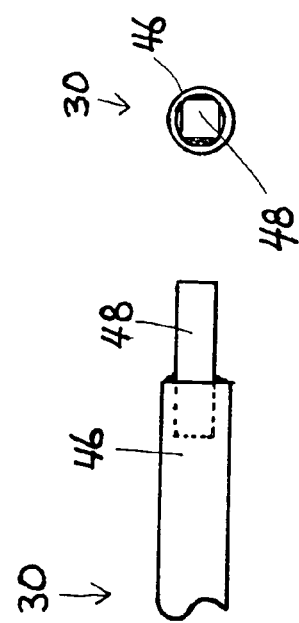

FIG. 5
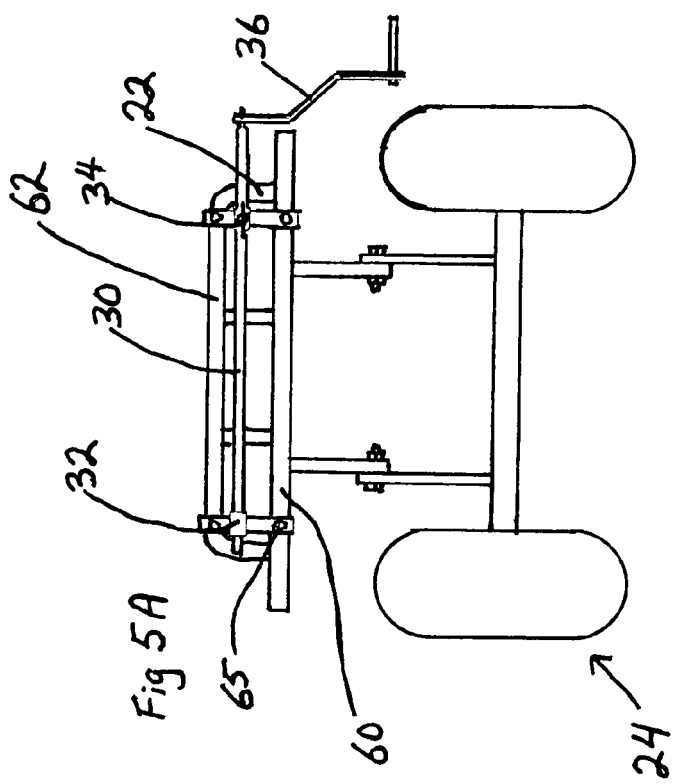
Fig 5A
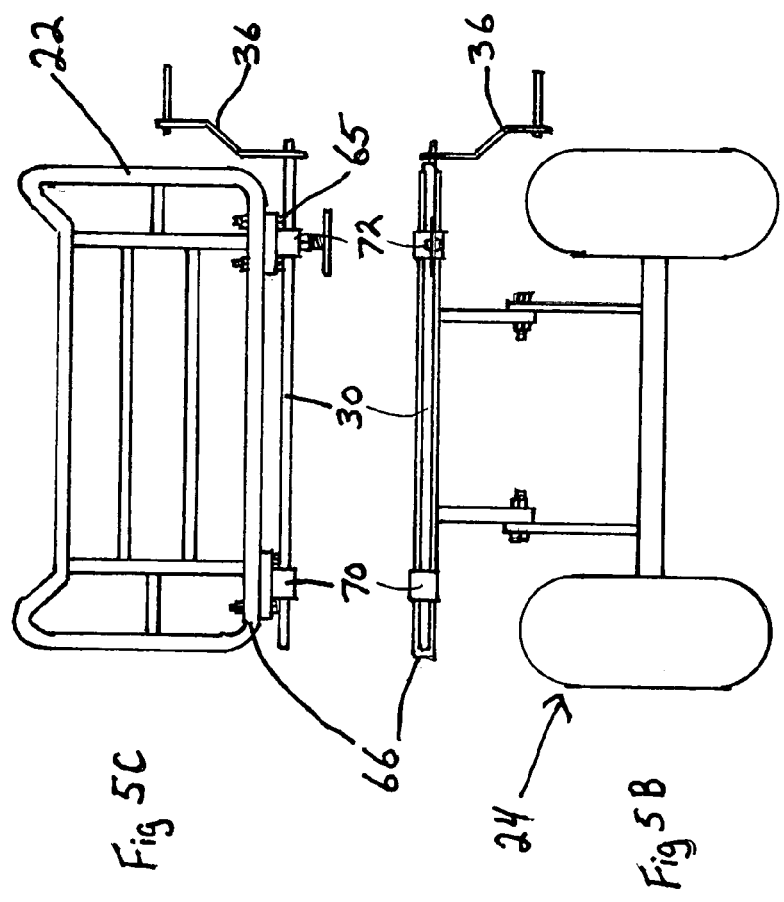
Fig 5C
Fig 5B

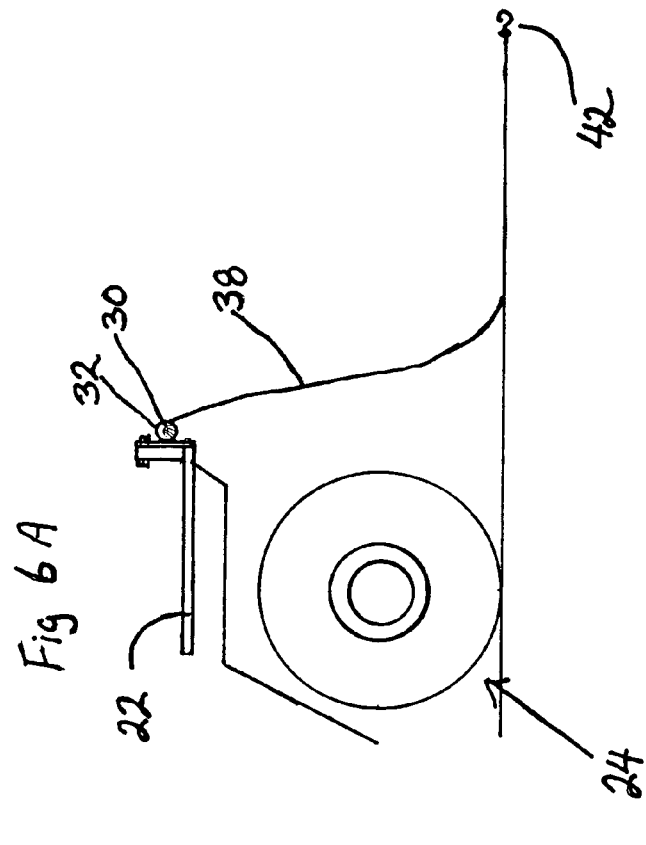
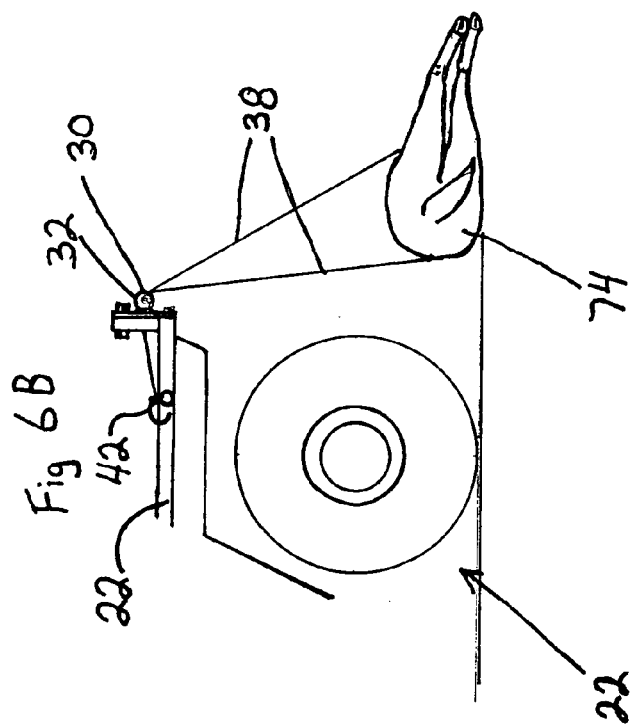
FIG. 6

DEVICE FOR MOUNTING ON A VEHICLE FOR HOISTING AND TRANSPORTING A BIG-GAME CARCASS

FIELD OF THE INVENTION

The present invention relates to a vehicle-mounted device for hoisting and transporting big game such as deer, and more particularly to a device for mounting on an all-terrain vehicle for transporting big game.

BACKGROUND OF THE INVENTION

Big-game hunting is practised throughout the world. Many big-game hunters use rough-terrain vehicles such as conventional four-wheel-drive pickup trucks, sport utility vehicles and all-terrain vehicles (such as the four-wheel vehicles commonly referred to as "quads"), when hunting. Many hunters prefer quads for hunting as they are smaller and generally more suitable for rough terrain and forested areas than pickup trucks and sport utility vehicles.

Typically, there are difficulties associated with transporting a big-game carcass from the kill site, which may be remote, forested and/or hilly. A big-game animal may weigh as much as several hundred pounds. It is typically extremely difficult or impossible for one person to lift the carcass of a big-game animal and it may not be possible for one person to load the carcass of a big game animal into a pickup truck or sport utility vehicle. The quads used in hunting typically have rear and front racks that are sufficiently strong to support the carcasses of some big-game animals. However, it is typically not possible for one person to lift the carcass of a big-game animal onto the rear or front rack of a quad. As well, generally, such racks are configured so that big-game animals cannot safely be carried on the racks, in that the carcass of a large animal on a rear rack will tend to intrude onto the operator's seat and a carcass on the front rack will interfere with the operator's ability to steer the quad, thus making operation of the quad more difficult and possibly dangerous.

Vehicle-mounted devices for hoisting game are known. For example, U.S. Pat. No. 4,806,063 (issued to York, 21 Feb. 1989); U.S. Pat. No. 6,089,431 (issued to Heyworth, 18 Jul. 2000); and U.S. Pat. No. 6,250,483 (issued to Frommer, 26 Jun. 2001) all disclose devices for mounting on a trailer hitch at the rear of a vehicle for hoisting a big-game animal such as a deer. The hoists disclosed in each of these patents comprise a substantially-vertical strut and boom arrangement and a single cable or rope for preferably attaching to the back legs of the animal such that when hoisted, the animal hangs lengthwise, head down. It would be awkward to transport a carcass thus suspended as it would tend to swing about unless secured. The strut disclosed in the Frommer patent is rotatable about a vertical axis relative to the vehicle to which the device is mounted such that a carcass lifted with the device can be swung toward the adjacent portion of the vehicle to which it is mounted, for example, into the box of a pickup truck. The strut disclosed in the Heyworth patent is similarly rotatable and the Heyworth patent contemplates using the device disclosed therein to hoist a big-game carcass for loading into a separate transportation means, such as a utility trailer. None of the devices disclosed in the York, Heyworth and Frommer patents are intended for supporting big-game carcasses during transport over rough terrain as the lengthwise suspension of the carcass would require that the carcass be strongly secured to prevent it from swinging. As well, the devices disclosed in these patents project above the tops of the vehicles to which they are attached and may tend to catch on overhanging branches in forested areas.

Vehicle mounted devices for transporting game are also known. For example, U.S. Pat. No. 5,219,106 (issued to Glunt, 15 Jun. 1993) discloses a device for mounting on a four-wheel-drive vehicle comprising a platform that when installed, overlies the hood of the vehicle. In use, a big-game carcass may be carried on the platform. The Glunt patent does not disclose a device for loading the big-game carcass onto the platform.

A device for mounting on an all-terrain vehicle, such as a quad, and intended for use in both lifting and transporting a game carcass is disclosed in U.S. Pat. No. 5,911,556 (issued to Caldwell, 15 Jun. 1999). The Caldwell device comprises a frame for pivotally mounting to the rear of a rear rack on a quad; and a leg pivotally mounted to the frame and having an angled "spade point" at the distal end of the leg. In use, when preparing to lift a carcass, the frame is pivoted down so that it projects rearwardly with its distal end resting on the ground, and the leg is positioned projecting forward from beneath the frame with the spade point resting on the ground. An animal carcass is then placed on the frame. Driving the quad forward causes the spade point to engage the ground, thus resisting further forward movement of the leg. As the quad moves forward the leg pushes the frame causing it to pivot upward and thereby lift the animal carcass. The frame projects above the quad rack in the up/carrying position and although the arms telescope, they may catch on overhanging branches. As well, the efficacy of the lifting operation of the Caldwell device depends on the character of the ground. For example, it appears that the Caldwell device might not work well on hard or frozen ground as the spade point might not penetrate such ground, or on muddy or swampy ground as such ground might offer insufficient resistence to the spade point to effect the lifting of the frame.

What is needed is a vehicle-mounted device for hoisting and transporting big-game carcasses that is suitable for transporting a carcass over rough terrain; is simple and robust; does not project from the vehicle to which it is attached in such a way as to tend to catch on overhanging branches; and is not dependent on the character of the ground for lifting.

SUMMARY OF THE INVENTION

In accordance with the present invention, there is provided an apparatus for mounting on a vehicle for hoisting a big-game carcass to a transport position and transporting the big-game carcass.

The apparatus of the present invention includes a rotatable longitudinally-extending reel, means for mounting the reel to a vehicle, two (or more) lift lines for attaching to the reel spaced one from the other, cranking means for rotating the reel and locking means for releasably locking the reel to prevent rotation of the reel.

In use, the reel is mounted to a vehicle such that the reel extends substantially horizontally and is positioned a sufficient distance from the ground to provide adequate clearance between an animal carcass suspended from the reel by the lift lines and the ground. Preferably, the reel is mounted at the rear of the vehicle, but, depending on the type of vehicle, the reel may be mounted at the front of the vehicle (for example, four-wheel drive trucks and sport utility vehicles often have heavy-duty protective grill guards, and quads typically have front racks, that may be suitable for mounting the reel) or on the side of the vehicle, though it is assumed that generally side-mounted would not be a convenient position for transporting the carcass of a big-game animal.

Preferably, the reel is cylindrical and of substantially-uniform circumference along its length. It is economical to make the reel from commercially-available steel pipe or solid round stock, such as shaft material. The reel includes means at one end for engaging the cranking means. Preferably, the cranking means is a hand-manipulable handle, such as a hand crank. Preferably, the handle and end of the reel are configured such that the handle may be removed from the reel when not needed for rotation of the reel. For example, the reel may have a rectangular projection and the handle may have a rectangular opening for matingly receiving the projection. Alternatively, the handle may be permanently attached to the reel, in which case the handle may be hinged so that it may be folded against the reel. Alternatively, the cranking means may include a motor, such as an electric motor driven by electricity provided by the vehicle, a hydraulic motor, or any suitable motor.

Preferably, the means for mounting the reel to a vehicle comprise two mounting brackets, each bracket having a bearing through which the reel is inserted and within which the reel rotates during use. Preferably, the reel and mounting brackets include means for impeding longitudinal movement of the reel relative to the mounting brackets during use. Preferably, such longitudinal movement of the reel is impeded by two cotter or similar pins inserted through two suitable holes in the reel, located so that the longitudinal movement of the reel in one direction is impeded by one of the cotter pins abutting a mounting bracket and in the other direction by the other of the pins abutting a mounting bracket.

Preferably, the locking means is a set screw having a threaded portion passing through a threaded hole in one of the bearings, such that the set screw may be used to clamp the reel in position within the bearing. Although it is believed that a set screw is a simple and robust means for locking the reel, other means of locking the reel in position may also be used. The reel could be clamped by other means, such as with a cam locking mechanism. Alternatively, a clutch or brake mechanism, or a ratchet and pawl assembly could be used. Further alternatively, the reel could be locked by aligning holes in the reel and the bearing, and inserting a pin or bolt into the holes.

Preferably, the lifting lines are rope, and preferably made from a synthetic material such as polyester. Alternatively, the lifting lines may be steel wire rope, or webbing.

Preferably, the means for attaching the proximal portions of the lift lines to the reel are moveable along the reel such that the spacing between the lift lines may be adjusted as needed to deal with different sized animals. Preferably the attaching means are two conventional hose clamps, one for each of the lift lines. In use, each hose clamp is placed around the reel, the proximal end of each lift line is interposed between a respective hose clamp and the reel, and, with each hose clamp in a desired position along the length of the reel, the hose clamp is tightened to clamp the lift line to the reel. Other suitable means for attaching the lift lines to the reel, such as holes through the reel through which the lift lines may be inserted and secured by knots, may also be used. It may also be possible to merely tie the lift lines to the reel with a suitable knot, but the lift lines could slip when supporting an animal carcass, for example due to jostling and vibration experienced with transporting the carcass over rough terrain.

Alternatively, a single line may be used for the lift line, with a mid-length portion of the line secured to the reel by a suitable means, such that each end of the single line is a lift line. However, such a configuration would make it difficult to adjust the spacing between the lift lines.

Further alternatively, more than two lift lines may be used. In some situations, it may be desirable to hoist and support the animal carcass during transport with three or more lift lines. Each such additional lift line may be attached to the reel with any of the suitable attachment means discussed above.

In use, when preparing to hoist an animal carcass, the user positions the lift lines so that they encircle the animal's trunk with the distal ends of the lift lines attached to the device (perhaps to the mounting means) or to the vehicle to which the device is mounted. Preferably, the lift lines have hooks at their distal ends to facilitate attaching the distal ends of the lift lines to the device or vehicle. However, any conventional means for releasably attaching an end of a line (including a knot or a cleat) may be used to attach the distal ends of the lift lines to the device or vehicle.

Once the lift lines are in position around the animal's trunk and the distal ends of the lift lines are secured, the animal may be hoisted by rotating the reel with the cranking means so as to reel in the lift lines. Once the carcass is hoisted to the transport position, the locking means is used to secure the reel and thus the lift lines. Once hoisted, the carcass is supported at two (or more, if more than two lift lines are used) spaced locations on the animal's trunk such that the trunk extends substantially horizontally. Carrying the carcass with the trunk extending horizontally rather than vertically permits the user to keep the center of gravity of the carcass relatively low, particularly if the carcass is positioned with the legs upward, which is the preferred position. Keeping the center of gravity of the carcass low may be important when a large animal is being transported with a small vehicle, such as a quad, which could become unstable in rough terrain or on slopes if the center of gravity of a heavy carcass were too high. If necessary, the legs and head of the animal may be tied with suitable line to the reel or the vehicle.

BRIEF DESCRIPTION OF THE DRAWINGS

FIG. 2A is a rear elevation view of the crank end of the reel shaft of the embodiment shown in FIG. 1.

FIG. 2B is a side elevation view of the crank end shown in FIG. 2A.

FIG. 2C is a side elevation view of the crank handle of the embodiment shown in FIG. 1.

FIG. 2D is a rear elevation view of the crank handle shown in FIG. 2C.

FIG. 5A is a rear elevation view of the embodiment shown in FIG. 1, shown mounted on a quad rear rack having two spaced-apart horizontally-extending rear rails, with the lift lines and retaining pins not shown for clarity and with most features of the quad also not shown for clarity.

FIG. 5B is a rear elevation view of an embodiment of the present invention having the mounts shown in FIGS. 4A, 4B and 4C, shown mounted on a quad rear rack having a single horizontally-extending rear rail, with the lift lines and retaining pins not shown for clarity and with most features of the quad also not shown for clarity.

FIG. 5C is a top view of the embodiment and rear rack shown in FIG. 5B.

FIG. 6A is a side elevation view of the embodiment shown in FIG. 1, shown mounted on a quad rear rack, with only one lift line shown for clarity, with the lift line on the ground in position to receive an animal carcass and with most features of the quad also not shown for clarity.

FIG. 6B is a side elevation view of the embodiment shown in FIG. 6A, showing a deer carcass in position to be hoisted.

DETAILED DESCRIPTION OF PREFERRED EMBODIMENT

Figure 1:
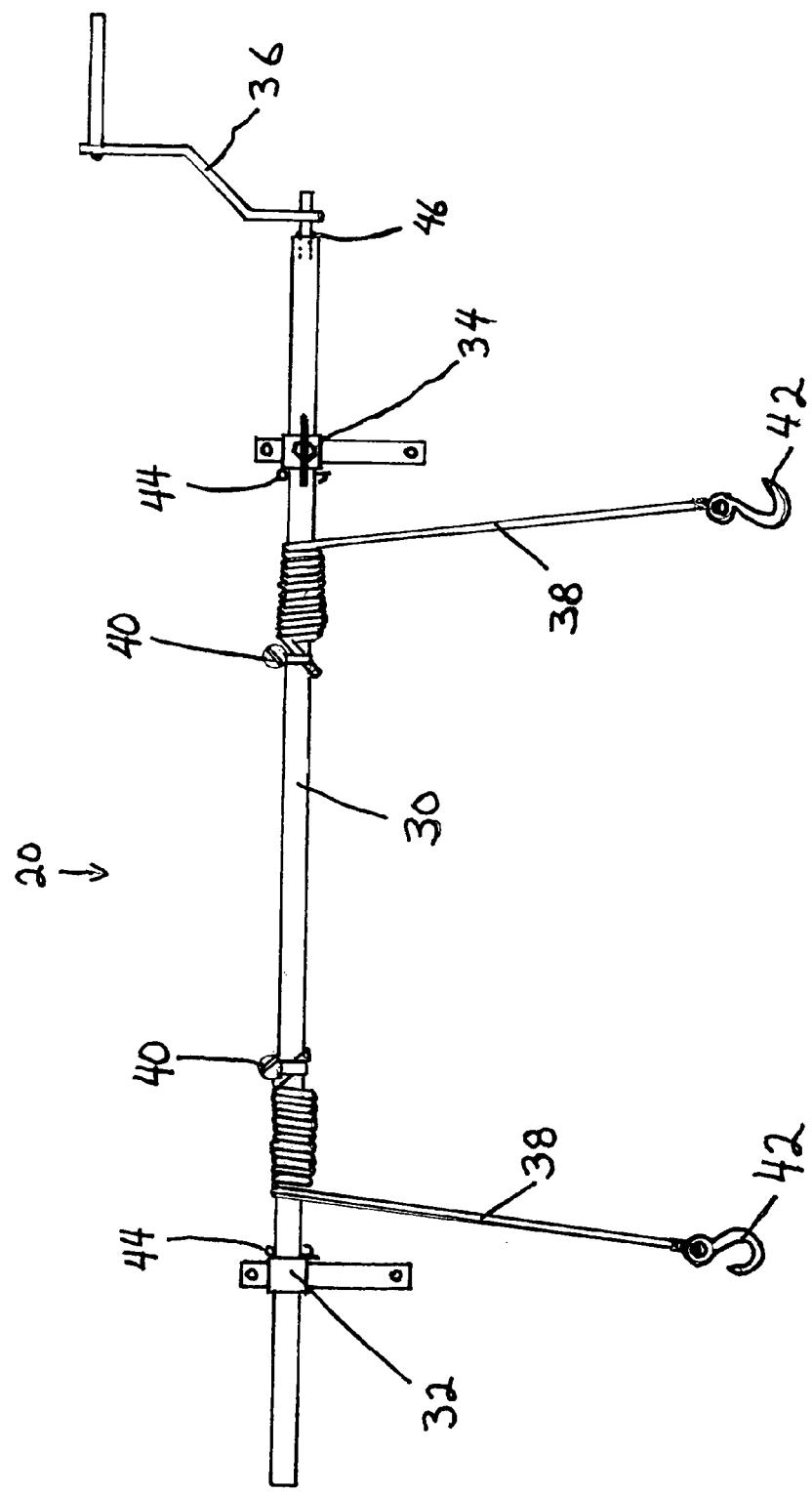
FIG. 1 is a rear elevation view of an embodiment of the present invention.

Referring to FIG. 1, there is illustrated a game hoisting and transporting device 20 suitable for mounting on a vehicle (such as to the rear rack 22 of a quad 24) in accordance with an embodiment of the present invention. The hoisting and transporting device 20 includes a reel shaft 30, a free-rotation mount 32, a locking mount 34, a crank 36, two lift lines 38, two hose clamps 40, two hooks 42 and two retaining pins 44. In use, the free-rotation mount 32 and locking mount 34 are attached to a vehicle; the reel shaft 30 passes through and is supported by the mounts 32, 34; the proximal end of each lift line 38 is clamped to the reel shaft 30 with a respective hose clamp 40; each hook 42 is attached to the distal end of a respective lift line 38; each retaining pin 44 is inserted in a hole through the reel shaft 30 proximate to a mount 32, 34 so as to impede longitudinal movement of the reel shaft 30 relative to the mounts 32, 34. During hoisting or lowering of an animal carcass, the crank 36 is engaged with the crank end 46 of the reel shaft 30.

As shown in FIGS. 2A, 2B, 2C and 2D, the crank end 46 has a projection 48, square in cross section, and the crank 36 has a corresponding square hole 49, into which the square projection 48 may be matingly and removably inserted so as to engage the crank 36 with the crank end 46 for imparting rotational movement to the reel shaft 30 by hand manipulation of the crank 36. In the embodiment shown in FIGS. 2A and 2B, the reel shaft 30 is a conventional steel pipe and the square projection 48 is a piece of conventional square steel stock partially inserted into the pipe and secured in position with spot welds. This crank end 46/crank 36 configuration is simple and robust. However, it will be clear that many alternative crank arrangements would also be suitable, including a handle (not shown) hingedly attached to the reel shaft 30 such that the handle could be folded against the reel shaft 30 when not in use.

Figure 3:
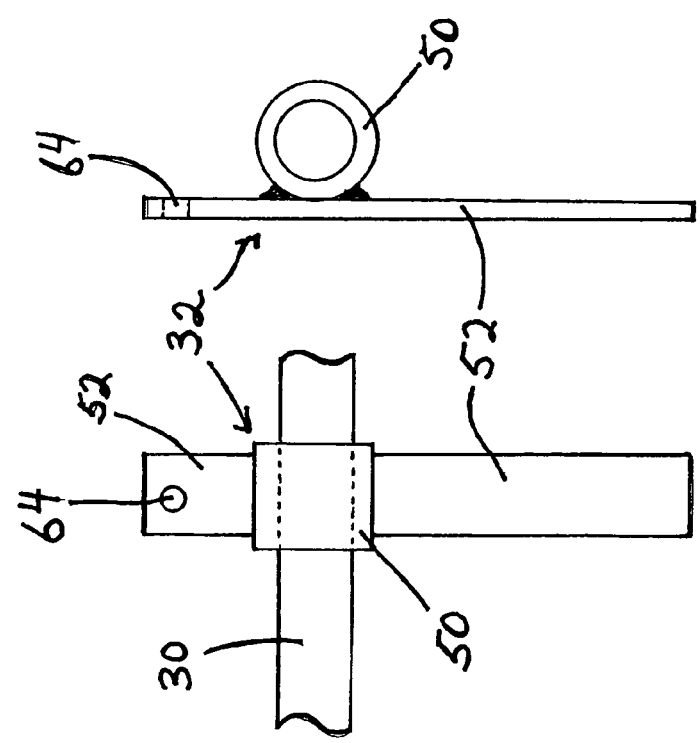
FIG. 3A is a rear elevation view of the free-rotation mount shown in FIG. 1, shown without a lower hole and with a section of reel shaft passing through it.
FIG. 3B is a side elevation view of the free-rotation mount shown in FIG. 3A, shown without the reel shaft.
FIG. 3C is a rear elevation view of the locking mount shown in FIG. 1, shown without a lower hole and with a section of reel shaft passing through it.
FIG. 3D is a side elevation view of the locking mount shown in FIG. 3C, shown without the reel shaft.
Figure 4:
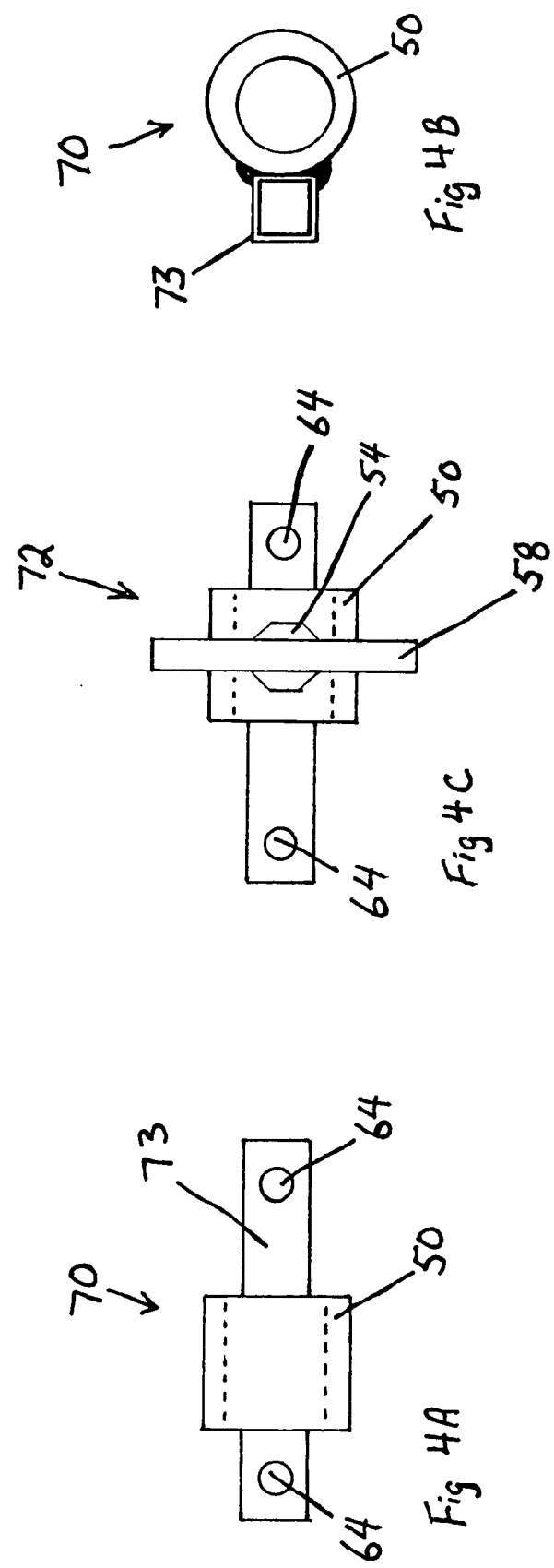
FIG. 4A is a rear elevation view of an alternative free-rotation mount embodiment suitable for attaching to a horizontally-extending member on a vehicle.
FIG. 4B is a side elevation view of the alternative free-rotation mount embodiment shown in FIG. 4A.
FIG. 4C is a rear elevation view of an alternative locking mount embodiment suitable for attaching to a horizontally-extending member on a vehicle.

As shown in FIGS. 3A, 3B, 3C and 3D, the free-rotation mount 32 and locking mount 34 each include a bearing 50 and a mounting plate 52. In use, as shown in FIGS. 3A and 3C, the reel shaft 30 passes through each of the bearings 50. The locking mount 34 also has a set screw 54 threadably engaging a threaded opening 56 in the bearing 50. The set screw 54 has a grip head 58. In use, the set screw 54 may be screwed in against the reel shaft 30 to lock the reel shaft 30 relative to the locking mount 34 and screwed out away from the reel shaft 30 so as to permit the reel shaft 30 to rotate relative to the locking mount 34.

Preferably, the bearing 50 is a piece of steel pipe, the mounting plate 52 is a piece of steel flat bar, and the bearing 50 and mounting plate 52 are welded together. As shown in FIGS. 3C and 3D, the threads of the threaded opening 56 may be provided by welding a nut to the exterior of the bearing 50, the nut being aligned with a hole in the bearing 50. The set screw 54 may be a conventional bolt with a piece of round stock welded to the bolt head and extending perpendicularly to the axis of rotation of the set screw 54, to form the grip head 58, as shown in FIGS. 3C and 3D. Alternatively, the grip head 58 may be a knurled knob or be otherwise configured such that it enables the user to manually apply sufficient torque to the set screw 54 to both securely lock and release the reel shaft 30 as needed.

The mounts 32, 34 shown in FIGS. 1, 3A, 3B, 3C and 3D, are intended for use in attaching the game hoisting and transporting device 20 to a vehicle having, for each mount, two vertically-spaced-apart attachment points suitable for receiving a bolt, such as the rear rack 22 shown in FIG. 5A, which has a lower rail 60 and an upper rail 62. Such vertically-spaced-apart rails 60, 62 on the rear racks 22 of quads 24 are common, but the spacing between the rails 60, 62 is typically different on different makes and models of quads 24. Therefore, it is preferable that the mounts 32, 34 be configured so as to accommodate different spacing of the rails 60, 62. The mounts 32, 34 shown in FIGS. 3A, 3B, 3C and 3D each have a mounting plate 52 sufficiently long to span the rails 60, 62 known to be on various makes of quads 24. Each mount 32, 34 has one bolt hole 64. Each mount 32, 34 is installed by drilling a hole through the upper rail 62; securing the mounting plate 52 to the upper rail 62 with a bolt 65 through the bolt hole 64 and hole drilled through the upper rail 62; drilling a hole through the mounting plate 52 and lower rail 60; and securing the mounting plate 52 to the lower rail 60 with a bolt 65 through the hole drilled though the lower rail 60 and mounting plate 52. Alternatively, the mounting plate 52 may contain a plurality of bolt holes 64 spaced so as to accommodate the known spacing of rails 60, 62 on various makes of quad 24. Alternatively, the mounting plate 52 may contain one pair or a plurality of pairs of holes, the holes of each pair spaced one from the other so as to accommodate a U-bolt (not shown) such that the mounting plate 52 may be attached to the rails 60, 62 with U-bolts so as to avoid drilling holes in the rails 60, 62.

As shown in FIGS. 5B and 5C, some quads 24 have only a single rail 66 at the rear of the rear rack 22. A secure attachment to such single rails 66 may be obtained by using the single-rail free-rotation mount 70 and single-rail locking mount 72 shown in FIGS. 4A, 4B, 4C, 5B and 5C. The single-rail mounts 70, 72 include a horizontally-extending (when installed) spacer tube 73 to which the bearing 50 is attached. The spacer tube 73 has two bolt holes 64. The single-rail mounts 70, 72 are installed by drilling holes in the single rail 66 aligned with the bolt holes 64 in the single-rail mounts 70, 72 and securing the single-rail mounts 70, 72 to the single rail 66 with bolts 65. The spacer tube 73 is sized to provide adequate clearance for the lift lines 38 between the reel shaft 30 and the single rail 66.

Once the mounts 32, 34 or 70, 72 are installed on the rear rack 22, the reel shaft 30 is inserted through the bearings 50. The reel shaft 30 is positioned within the bearings 50 such that the crank 36, when engaged with the crank end 46, is free to rotate without interference from the rear rack 22 or other parts of the quad 24. Once the reel shaft 30 is in the desired position, holes are drilled through the reel shaft 30 for the retaining pins 44. Each hole is drilled adjacent to a bearing 50 to impede longitudinal movement of the reel shaft 30 relative to the bearings 50. As a small amount of longitudinal play of the reel shaft 30 does not interfere with the functioning of the game hoisting and transporting device 20, the holes for the retaining pins 44 need not be precisely located. Alternatively, the reel shaft 30 may be provided to the user with a plurality of pre-drilled holes, such that rather than drilling holes, the user may simply select suitable holes from the plurality of holes for the retaining pins 44. In the embodiment shown in FIG. 1, each retaining pin is located adjacent to a respective mount 32, 34 and between the mounts 32, 34. In FIG. 1, the retaining pins 44 are shown as cotter pins, but a variety of conventional removeable pins would be suitable.

Figure 7:
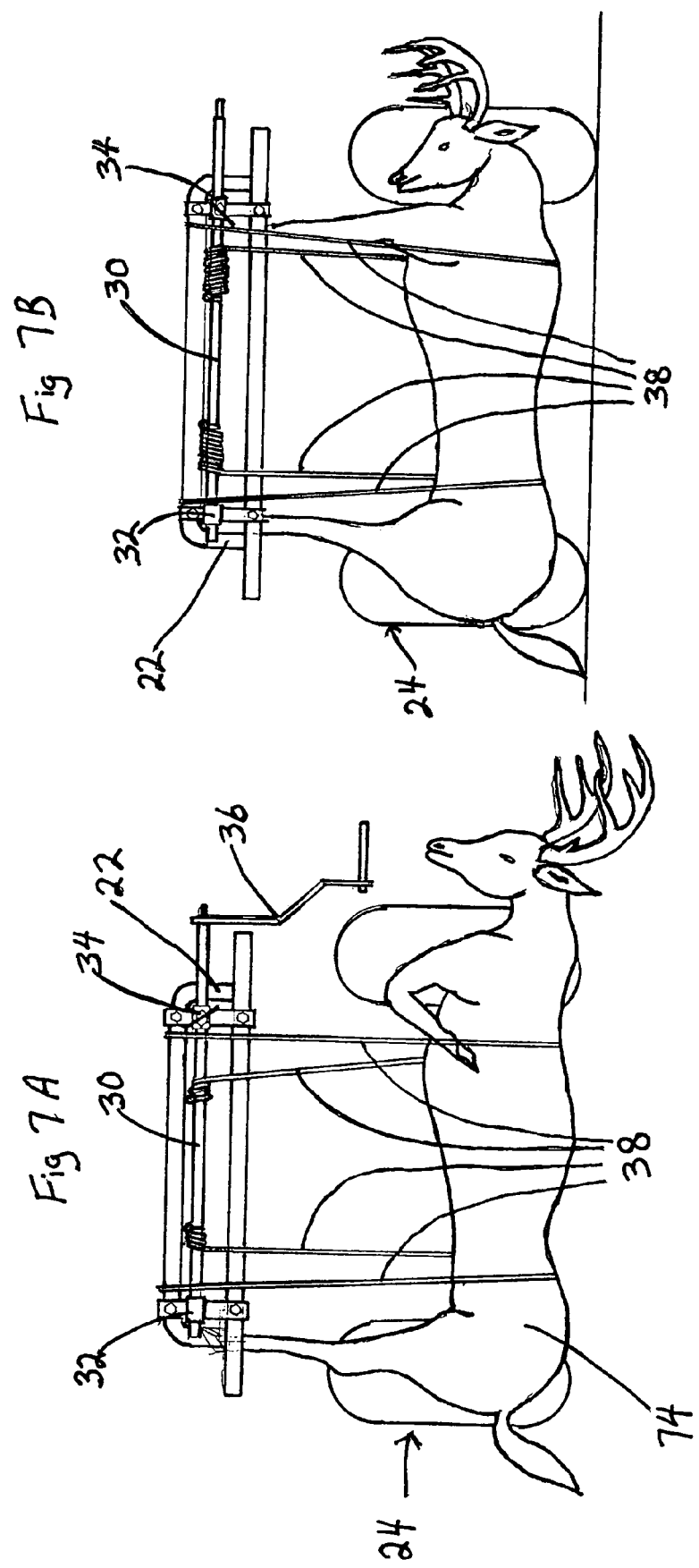
FIG. 7A is a rear elevation view of the embodiment shown in FIGS. 6A and 6B, showing a deer carcass partially hoisted.
FIG. 7B is a rear elevation view of the embodiment shown in FIGS. 6A, 6B and 7A, showing a deer carcass hoisted to the transport position, with lines used to raise the deer's head and secure its legs not show for clarity.

Once the reel shaft 30 is mounted in the mounts 32, 34 or 70, 72, the proximal end of each lift line 38 is clamped to the reel shaft 30 with a respective hose clamp 40. Depending on the size of the carcass and the strength of the reel shaft 30, it is generally preferable to position the lift lines 38 such that the portion of each lift line 38 supporting the carcass come off the reel shaft 30 close to a respective bearing 50, to avoid bending the reel shaft 30. Therefore, it is generally preferable to position the hose clamps 40 and proximal ends of the lift lines 38 on the reel shaft 30 such that each lift line 38 spools towards a respective bearing 50 as the carcass is hoisted. Typically, the hose clamps 40 and proximal ends of the lift lines 38 are positioned on the reel shaft 30 between the bearings as shown in FIGS. 1, 7A and 7B. However, the distal end of one or the other or both of the lift lines 38 may be attached to the reel shaft 30 outwards of the respective bearing 50.

The surface of the reel shaft 30 may be scored or otherwise roughened to increase the security of the attachment of the lift lines 38 to the reel shaft 30, but it has been found that in use, clamping with the hose clamps 40 provides a sufficiently secure attachment to even a smooth reel shaft 30, so long as a few wraps of lift line 38 are on the reel shaft 30 before load tension is applied to the lift line 38.

In the embodiment shown in the drawings, the lift lines 38 are conventional synthetic rope. It will be apparent that a variety of different line sizes and material are suitable for the lift lines 38. Each hook 42 is attached to the distal end of a respective lift line 38 by conventional means such as an eye splice or knot.

FIGS. 6A, 6B, 7A and 7B show the hoisting of a deer 74 with the game hoisting and transporting device 20 attached to the rear rack 22 of a quad 24. As shown in FIG. 6A, preparatory to hoisting the deer, sufficient length of each lift line 38 to encircle the deer 74 (not shown in FIG. 6A) and return to the rear rack 22 is unspooled from the reel shaft 30 and laid on the ground extending rearward from the quad. As shown in FIG. 6B, the deer 74 is positioned on the lift lines 36, with its trunk roughly beneath the reel shaft 30 and with its trunk extending roughly parallel to the reel shaft 30. The hooks 42 are used to connect the distal ends of the lift lines 38 to the rear rack 22, so as to form each lift line 38 into a sling encircling the deer 74. Alternatively, each hook 42 may be hooked to its respective lift line 38 so that each lift line 38 functions as a choker rather than a sling, but using the lift lines as chokers: and reduces the mechanical advantage as compared to using the lift lines 38 as slings; makes it difficult to rotate the animal carcass relative to the lift lines 38 during hoisting.

As shown in FIG. 7A, prior to commencing hoisting, the deer 74 may be rolled so that its limbs are upward. The deer 74 is hoisted by hand turning the crank 36 so as to spool the lift lines 38 onto the reel shaft 30. The movement of the lift lines 38 as they are spooled onto the reel shaft 30 may tend to cause the deer to rotate clockwise (as viewed in FIG. 6b) away from the desired legs-up position. However, it has been found that the animal carcass may be rotated by hand within the lift line 38 slings so as to maintain the desired legs-up position. Further, it is possible to route the lift lines 6B around the animal carcass opposite to that shown in FIGS. 6B, 7A and 7B, that is with the lift lines 38 running from the reel shaft 30 over the top of the animal carcass, then under the animal carcass and up to the rear rack 22. With the lift lines 38 thus routed, an animal carcass positioned as is the deer in FIG. 6B, will tend to rotate towards the desired legs-up position as it is hoisted. However, it has been found that thus routing the lift lines 38 is awkward and doing so is generally not necessary as it is relatively easy to rotate the animal carcass in the loops of the lift lines 38 as it is being hoisted.

The position of the lift lines 38 on the reel shaft 30 and the distance between them may be readily adjusted by slackening the lift lines 38, loosening the hose clamps 40, moving the hose clamps 40 and lift lines 38 to their desired positions, and tightening the hose clamps 40.

FIG. 7A shows the deer 74 partially hoisted. FIG. 7B shows the deer 74 hoisted to the transport position, at which position, the set screw 54 is used to lock the reel shaft 30 and the crank 36 may be removed. Depending on the type of animal, the animal's legs may be secured for transport by inserting them into openings in the rear rack 22, tying them to the rear rack 22 or both. Usually, the animal's head is raised and secured by tying it to the rear rack 22 with a piece of line (not shown in FIG. 7B).

Conveniently, when it is desired to use the quad 24 for purposes other than transporting big game, the majority of the components of the device 20 may be quickly demounted from the quad 24 by removing the hose clamps 40 and lift lines 38 from the reel shaft 30, removing the retaining pins 44 and withdrawing the reel shaft from the mounts 32, 34 or 70, 72, leaving only the relatively-small and unobtrusive mounts 32, 34 or 70, 72 attached to the rear rack 22.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for mounting on a vehicle for hoisting a big-game carcass to a transport position and transporting the big-game carcass, the apparatus comprising:
   a) a rotatable reel;
   b) two lift lines;
   c) attaching means for attaching the lift lines to the reel such that the distal portions of the lift lines are spaced apart one from the other along the length of the reel and wherein the attaching means are moveable along the length of the reel so as to permit adjustment of the space between the distal portions of the lift lines;

d) mounting means for mounting the reel to a vehicle;
e) cranking means for rotating the reel; and
f) locking means for releasably locking the reel to impede rotation of the reel;

wherein, when the reel is mounted, the lift lines are operable to encircle a big game carcass such that the lift lines are spaced one from the other along the trunk of the carcass, the cranking means is operable to rotate the reel so as to spool in the lift lines and thus hoist the carcass to a transport position, and the locking means is operable to releasably lock the reel when the carcass is in the transport position.

2. Apparatus of claim 1, wherein the reel is cylindrical and of substantially-uniform circumference along its length.

3. Apparatus of claim 2, wherein the reel is a pipe.

4. Apparatus of claim 1, wherein the mounting means comprises two mounting brackets, each bracket including a bearing for rotatably supporting the reel such that the reel is rotatable relative to each bearing when in use.

5. Apparatus of claim 4, wherein the locking means comprises a threaded set screw and a threaded opening in one of the bearings for receiving the set screw, wherein the reel is operable to be releasably locked by screwing the set screw into the opening so as to clamp the reel between the set screw and the bearing.

6. Apparatus of claim 4, for mounting on a quad having a rack with vertically-spaced-apart rails, wherein each mounting bracket also includes a mounting plate attached to the bearing, the mounting plate configured to span the rails such that the mounting plate is operable to be attached to each of the rails.

7. Apparatus of claim 4, for mounting on a quad having a rack with a single rail, wherein each mounting bracket also includes a spacer attached to the bearing, the spacer for bolting to the rail and sized so as to provide clearance for the lift lines between the rail and the reel when bolted to the rail.

8. Apparatus of claim 4, wherein the bearings and reel are configured to have a loose fit between each bearing and the reel, such that the reel is operable to be moved longitudinally relative to the bearings so as to withdraw the reel from the bearings.

9. Apparatus of claim 8, further comprising releaseable retaining means for impeding longitudinal movement of the reel relative to the bearings.

10. Apparatus of claim 9, wherein the retaining means comprises two retaining pins and two retaining pin receiving holes in the reel.

11. Apparatus of claim 1, wherein the cranking means comprises a hand manipulable handle.

12. Apparatus of claim 1, wherein the cranking means is a hand crank.

13. Apparatus of claim 12, wherein the reel includes a crank end releasably engageable with the hand crank, wherein the hand crank is operable to be engaged with the crank end for rotating the reel and disengaged from the reel when not required for rotating the reel.

14. Apparatus of claim 1, wherein the attaching means comprise two clamps, one for each lift line, for clamping the proximal end of each lift line to the reel.

15. Apparatus of claim 1, wherein the attaching means are hose clamps.

16. Apparatus of claim 1, further comprising two hooks, each hook for attaching to the distal end of a respective lift line.

17. Apparatus of claim 1, further comprising one or more additional lift lines and attaching means for attaching the additional lift lines to the reel.

* * * * *